United States Patent
Seki

(10) Patent No.: US 9,857,202 B2
(45) Date of Patent: Jan. 2, 2018

(54) SENSOR FOR MOTOR

(71) Applicant: SANYO DENKI CO., LTD., Tokyo (JP)

(72) Inventor: Takayoshi Seki, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 0 days.

(21) Appl. No.: 15/159,193

(22) Filed: May 19, 2016

(65) Prior Publication Data

US 2016/0349081 A1 Dec. 1, 2016

(30) Foreign Application Priority Data

May 28, 2015 (JP) .................................. 2015-108916

(51) Int. Cl.
*G01D 5/14* (2006.01)

(52) U.S. Cl.
CPC .................................... *G01D 5/145* (2013.01)

(58) Field of Classification Search
CPC ...................................................... G01D 5/145
See application file for complete search history.

(56) References Cited

U.S. PATENT DOCUMENTS

| 6,584,858 | B1 * | 7/2003 | Miyazawa | ............. | G01N 19/04 73/150 A |
| 7,642,681 | B2 | 1/2010 | Makiuchi | | |
| 2004/0245957 | A1 * | 12/2004 | Shibata | .................. | G11B 19/28 318/560 |
| 2014/0167572 | A1 * | 6/2014 | Woo | ..................... | H02K 11/215 310/68 B |
| 2014/0300254 | A1 * | 10/2014 | Yoshidomi | ............ | G01P 3/4815 310/68 B |

FOREIGN PATENT DOCUMENTS

JP 2007060844 3/2007

* cited by examiner

*Primary Examiner* — Jermele M Hollington
*Assistant Examiner* — Zannatul Ferdous
(74) *Attorney, Agent, or Firm* — Rankin, Hill & Clark LLP

(57) ABSTRACT

A sensor for motor includes: a detected plate mounted to a rotating shaft of a motor, the detected plate including a plurality of rod-shaped portions having different lengths from one another, the plurality of rod-shaped portions radially projecting from the rotating shaft; a detecting member configured to output a signal having a waveform that changes according to the rod-shaped portions passing through a front of the detecting member; and a movable member that holds the detecting member.

20 Claims, 4 Drawing Sheets

SENSOR FOR MOTOR

CROSS-REFERENCE TO RELATED APPLICATION

This application claims priority from Japanese Patent Application No. 2015-108916 filed with the Japan Patent Office on May 28, 2015, the entire content of which is hereby incorporated by reference.

BACKGROUND

1. Technical Field

The present disclosure relates to a sensor for motor.

2. Description of the Related Art

The rotary electric machine equipped with a magnetic sensor disclosed in JP-A-2007-060844 includes a permanent magnet, which rotates around the rotational center of the rotating shaft, and a magnetic sensor, which detects a leakage flux leaked from this permanent magnet, for detection of a rotation of the motor.

SUMMARY

A sensor for motor includes: a detected plate mounted to a rotating shaft of a motor, the detected plate including a plurality of rod-shaped portions having different lengths from one another, the plurality of rod-shaped portions radially projecting from the rotating shaft; a detecting member configured to output a signal having a waveform that changes according to the rod-shaped portions passing through a front of the detecting member; and a movable member that holds the detecting member.

DESCRIPTION OF THE EMBODIMENTS

Figure 1:
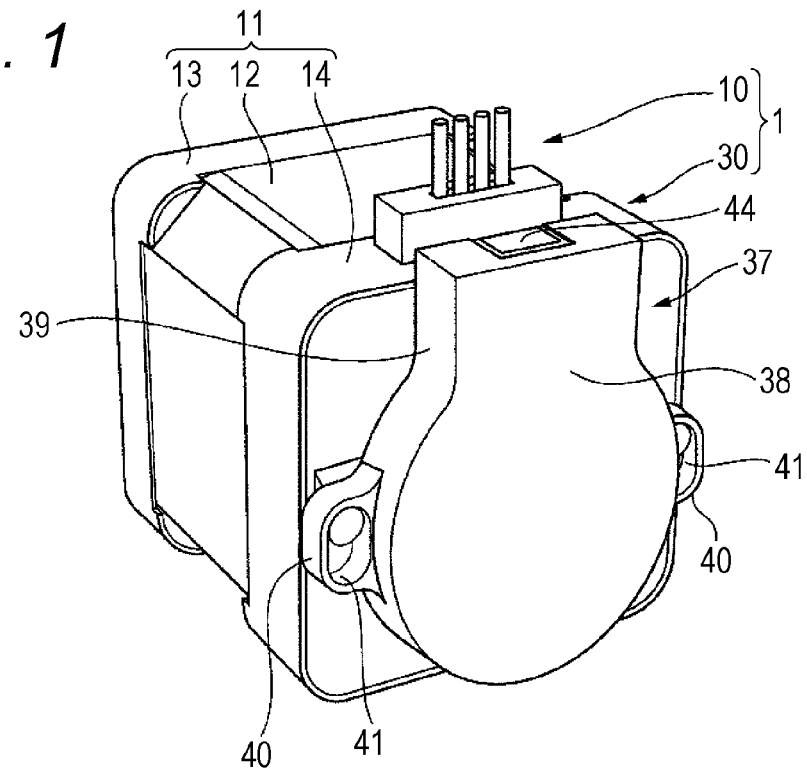
FIG. 1 is an external perspective view of a magnetic sensor equipped motor that includes a sensor for motor according to an embodiment of the present disclosure.
Figure 2:
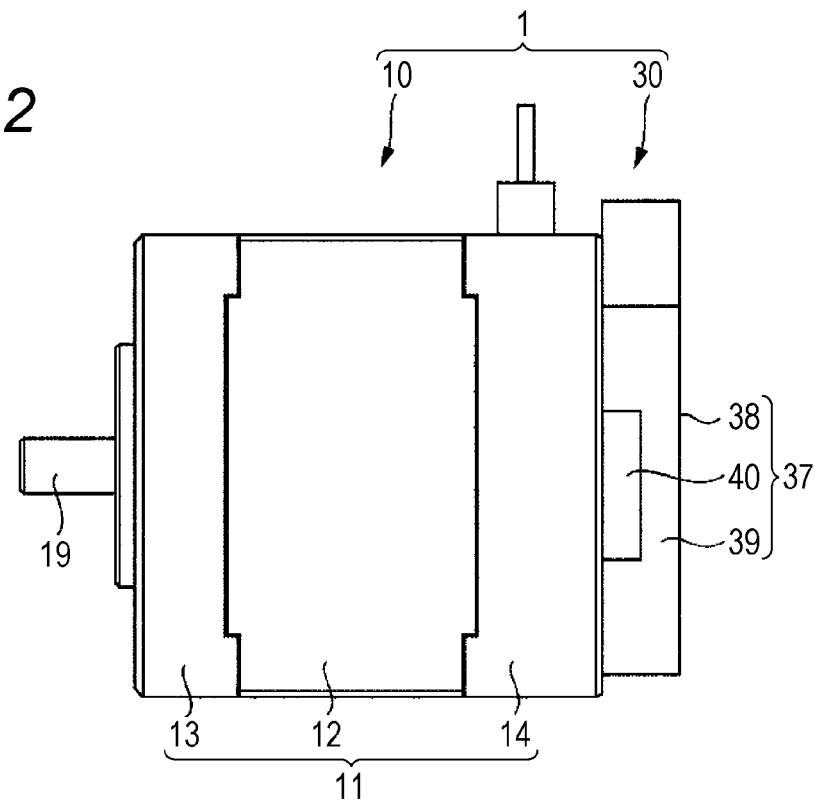
FIG. 2 is a side view of the magnetic sensor equipped motor illustrated in FIG. 1.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the rotary electric machine disclosed in JP-A-2007-060844, the magnetic sensor is housed in the dedicated sensor receiving portion formed in the case to house the magnetic sensor. In view of this, to change rotation detection signals obtained by the magnetic sensor to a different waveform, the location(s) and the number of the permanent magnets and the location(s) and the number of the magnetic sensors need to be redesigned from the beginning. Whenever the detection of motor rotation is requested, the locations and the numbers of the respective permanent magnets and magnetic sensors need to be designed.

Thus, with the sensor for motor, which detects the motor rotation, changing the waveform of the rotation detection signals was not easy.

A sensor for motor according to one aspect of the present disclosure (the present sensor) includes: a detected plate mounted to a rotating shaft of a motor, the detected plate including a plurality of rod-shaped portions having different lengths from one another, the plurality of rod-shaped portions radially projecting from the rotating shaft; a detecting member configured to output a signal having a waveform that changes according to the rod-shaped portions passing through a front of the detecting member; and a movable member that holds the detecting member.

The present sensor can move the detecting member together with the movable member. This ensures switching the number of rod-shaped portions detected by the detecting member among the plurality of rod-shaped portions of the detected plate. The detecting member outputs signals that have a waveform changed by the rod-shaped portion passing through the front of the detecting member. The present sensor moves the detecting member together with the movable member to ensure switching (changing) the waveform of the output signals from the detecting member. Accordingly, the present sensor can easily change the waveform of the rotation detection signal.

The following describes embodiments of the present invention with reference to the drawings.

Figure 3:
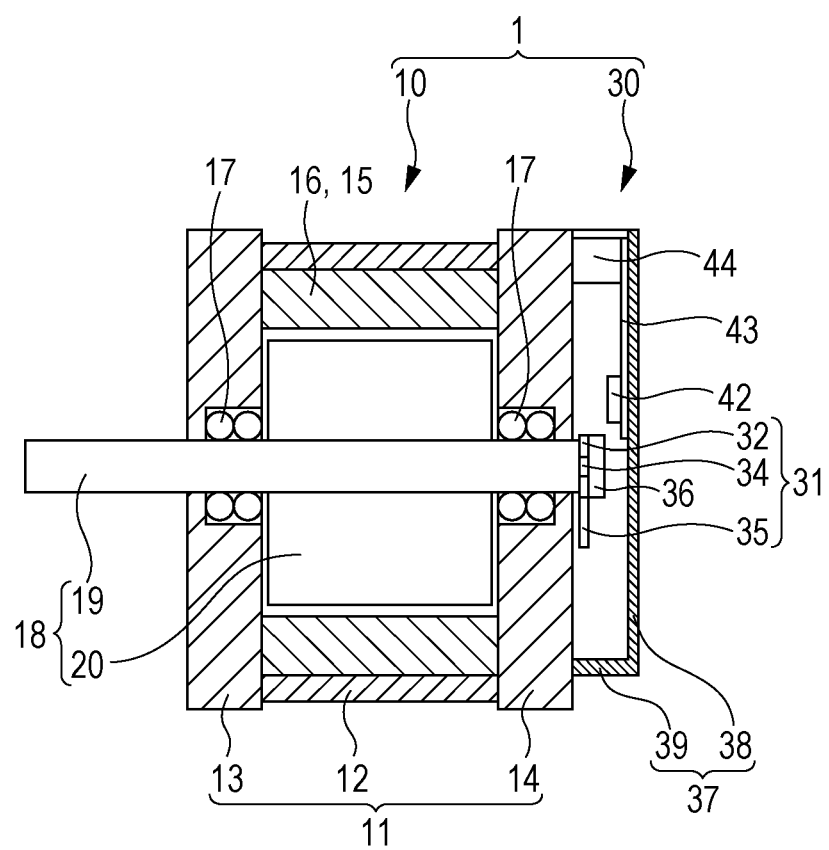
FIG. 3 is a vertical cross-sectional view of the magnetic sensor equipped motor illustrated in FIG. 1.

A magnetic sensor equipped motor 1 in FIG. 1 includes a motor portion 10 and a sensor 30, which functions as a sensor for motor. As illustrated in FIG. 3, the motor portion 10 includes a housing 11, a stator 15, and a rotor 18.

The housing 11 has a quadrangular prism-shaped tube case 12, a front end cap 13, and a rear end cap 14. The front end cap 13 and the rear end cap 14 are each fitted to and secured to one end and the other end of the tube case 12. Securing the front end cap 13 and the rear end cap 14 to the respective both ends of the tube case 12 forms an internal space that can house the rotor 18 and the stator 15 inside the housing 11.

The stator 15, for example, includes a stator core 16 secured to the inside of the tube case 12 and a winding wire wound around the stator core 16. Energizing the winding wire of the stator 15 generates a magnetic field inside the stator core 16.

The rotor 18, for example, includes a columnar-shaped long shaft 19 and a columnar-shaped permanent magnet core 20. The shaft 19 is inserted into and secured to the permanent magnet core 20. Both ends of the shaft 19 project to both sides of the columnar-shaped permanent magnet core 20. Both ends of the shaft 19 are inserted into and pivotally supported to center holes of the front end cap 13 and the rear end cap 14 via a pair of bearing members 17. Accordingly, the rotor 18 is rotatably and pivotally supported to the inside of the stator core 16.

One end of the shaft 19 of the rotor 18 projects forward with respect to the front end cap 13. The other end of the shaft 19 of the rotor 18 projects rearward with respect to the rear end cap 14. A part of the shaft 19 projecting forward with respect to the front end cap 13 functions as an output shaft. A part of the shaft 19 projecting rearward with respect to the rear end cap 14 functions as a detection shaft detected by the sensor 30.

With the motor portion 10, energizing the winding wire of the stator 15 causes the magnetic field in the stator 15 to act on the permanent magnet core 20 of the rotor 18. This generates electromagnetic suction and repealing effects between the stator 15 and the rotor 18. Consequently, the rotor 18 and the shaft 19 can rotate inside the stator 15.

Figure 4:
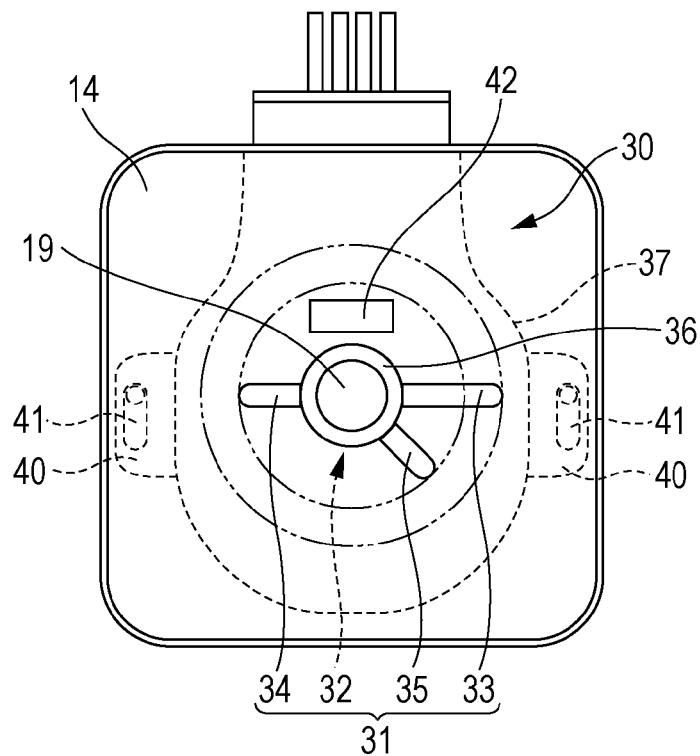
FIG. 4 is an explanatory view of the magnetic sensor equipped motor that includes a sensor in which a movable cover member is disposed at a lowest position.
Figure 5:
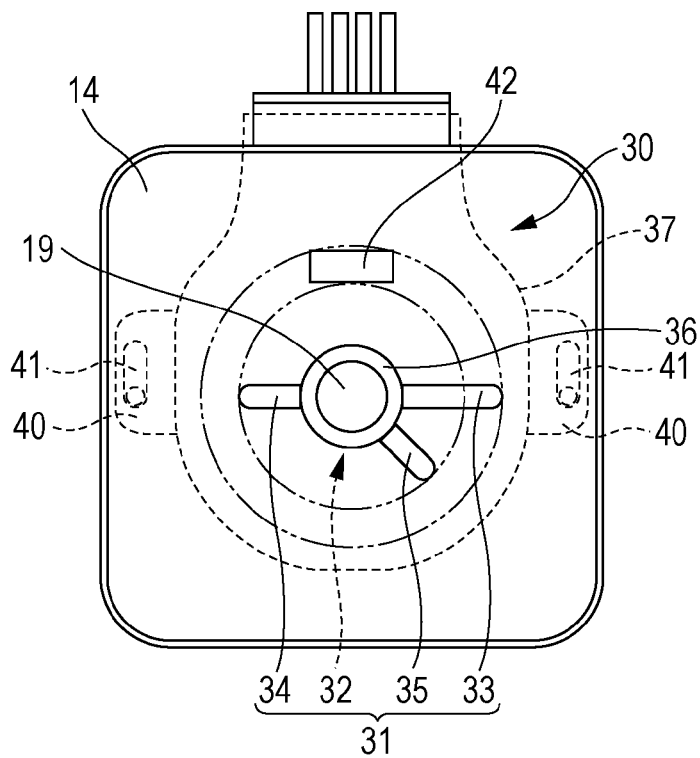
FIG. 5 is an explanatory view of the magnetic sensor equipped motor that includes a sensor in which the movable cover member is disposed at an uppermost position.

FIGS. 4 and 5 are transparent views viewing the magnetic sensor equipped motor 1 from rearward.

The sensor 30 includes a detected plate 31, a ring-shaped permanent magnet 36, a cover member (a movable member) 37, and a Hall element (a detecting member) 42. Furthermore, as illustrated in FIG. 3, the sensor 30 includes a substrate 43 and a connector 44. FIGS. 4 and 5 illustrate the cover member 37 by dotted lines.

The detected plate 31 includes stacked electromagnetic steel plates formed into a desired outer shape. The detected plate 31 of this embodiment includes a ring portion 32 and three pieces of linear rod-shaped portions, a first rod-shaped portion 33, a second rod-shaped portion 34, and a third rod-shaped portion 35. The shaft 19 is inserted into and mounted to the ring portion 32. The first rod-shaped portion 33, the second rod-shaped portion 34, and the third rod-shaped portion 35 radially project from the ring portion 32. The first rod-shaped portion 33, the second rod-shaped portion 34, and the third rod-shaped portion 35 are, for example, formed by electromagnetic steel plate.

As illustrated in FIG. 3, the ring portion 32 of this embodiment is formed into a ring shape at a size identical to the ring-shaped permanent magnet 36. Into the center hole of the ring portion 32, the shaft 19 projecting from the rear end cap 14 is inserted. The longest first rod-shaped portion 33 and the second rod-shaped portion 34 project from the ring portion 32 to directions opposite from one another. The third rod-shaped portion 35 projects from the position between the first rod-shaped portion 33 and the second rod-shaped portion 34 at the ring portion 32. The third rod-shaped portion 35 has a length identical to the second rod-shaped portion 34. The first rod-shaped portion 33 is longer than the second rod-shaped portion 34 and the third rod-shaped portion 35.

Mounting the detected plate 31 to the shaft 19 causes the first rod-shaped portion 33, the second rod-shaped portion 34, and the third rod-shaped portion 35 to rotate with the shaft 19 on trajectories with rotation radiuses according to the respective lengths. In FIGS. 4 and 5, the trajectories of the first rod-shaped portion 33, the second rod-shaped portion 34, and the third rod-shaped portion 35, which rotate together with the shaft 19, are shown by two-dot chain lines.

The ring-shaped permanent magnet 36 is mounted to the shaft 19 closely stacked to the detected plate 31. This causes the first rod-shaped portion 33, the second rod-shaped portion 34, and the third rod-shaped portion 35 to function as magnetic paths for the permanent magnet 36.

Thus, the ring-shaped permanent magnet 36 is combined with the detected plate 31 formed by the electromagnetic steel plates. This ensures collecting these masses to the center of or near the columnar-shaped shaft 19. Accordingly, a moment of rotation of the detected plate 31 and the permanent magnet 36, which become a rotational load when the shaft 19 is rotatably driven, can be restrained small.

In contrast to this, for example, in the case where a plurality of rod-shaped permanent magnets corresponding to the respective first rod-shaped portion 33, second rod-shaped portion 34, and third rod-shaped portion 35 are disposed, a strong securing structure to secure the rod-shaped permanent magnets to the rotating shaft 19 is necessary. Furthermore, a moment of rotation to rotate the rod-shaped permanent magnets is also necessary. Accordingly, the moment of rotation is likely to be large.

The cover member 37 is movably mounted to the rear side of the rear end cap 14 to cover the detected plate 31, the ring-shaped permanent magnet 36, and the Hall element 42. That is, the cover member 37 is mounted to the housing 11 of the magnetic sensor equipped motor 1 to cover the detected plate 31. The cover member 37 is made of a resin material or a metallic material. The cover member 37 includes a vertically elongated back surface portion 38, a side surface portion 39 disposed upright on the peripheral edge, and a pair of mounters 40. The pair of mounters 40 is formed to project from the side surface portion 39 to both the right and left sides.

At the pair of mounters 40 at both the right and left of the cover member 37, a pair of elongated hole-shaped slits 41 long in the vertical direction is formed. By screwing the pair of mounters 40 to the rear side of the rear end cap 14, the cover member 37 is stacked over the rear end cap 14 at the rear side of the rear end cap 14, thus being directly secured to the motor portion 10. Loosening the screws allows the cover member 37 to vertically move. That is, the cover member 37 has the elongated hole-shaped slits 41. Through these slits 41, the cover member 37 is screwed to the housing 11.

The cover member 37 is, for example, mounted to the motor portion 10 (the rear end cap 14) to be vertically movable such that the cover member 37 is away of the shaft 19 in the upper direction.

In the state illustrated in FIG. 4, the cover member 37 is lowered most (hereinafter referred to as a lowest position) such that the screws are in contact with the upper ends of the slits 41. In the state illustrated in FIG. 5, the cover member 37 is raised most (hereinafter referred to as the upper most position) such that the screws are in contact with the lower ends of the slits 41. The cover member 37 is vertically movable in a range from the lowest position to the uppermost position. Screwing the cover member 37 at the lowest position or the uppermost position ensures securing the cover member 37 at these positions.

The Hall element 42 magnetically detects a change in an external magnetic field by Hall effect. The Hall element 42 outputs signals that have a waveform changing according to the change in the external magnetic field. For example, assume that the permanent magnet is moved to one direction so as to pass through the front of the Hall element 42. In this case, the magnetic field acting on the Hall element 42 changes. Consequently, the waveform of the signals output from the Hall element 42 changes into a pulse shape or a reverse pulse shape. That is, the Hall element 42 outputs the signals having the waveform that changes according to the rod-shaped portion passing through the front of the Hall element 42.

The Hall element 42 is mounted to the lower end of the substrate 43. The substrate 43 is mounted to a position on an upper side with respect to the shaft 19 at the inner surface of the cover member 37. Thus, the Hall element 42 and the substrate 43 are mounted to the back surface of the cover member 37 (the surface on the rear end cap 14 side).

Accordingly, the Hall element 42 and the substrate 43 move together with the cover member 37.

The connector 44 is mounted to the upper end of the substrate 43. The connector 44 feeds power to the Hall element 42 and outputs the signals from the Hall element 42 to, for example, an external device of the motor portion 10. Thus, the Hall element 42 is disposed so as to move vertically together with the cover member 37. This ensures changing a distance from the shaft 19 to the Hall element 42.

Figure 6:
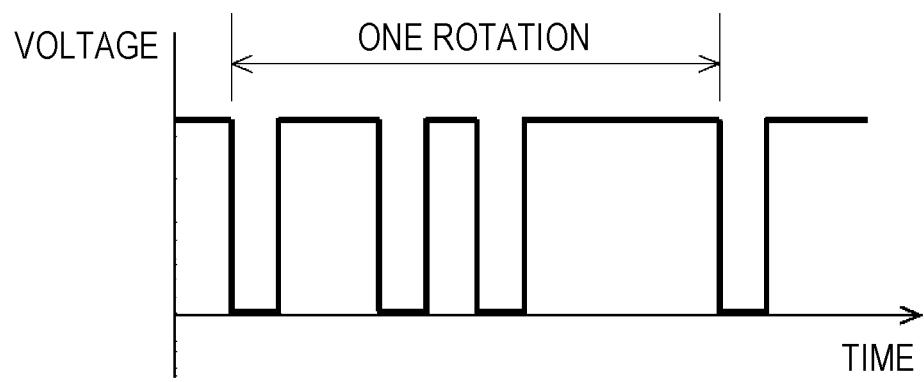
FIG. 6 is a schematic waveform diagram of detection signals from a Hall element when the cover member is disposed at the lowest position as illustrated in FIG. 4.
Figure 7:
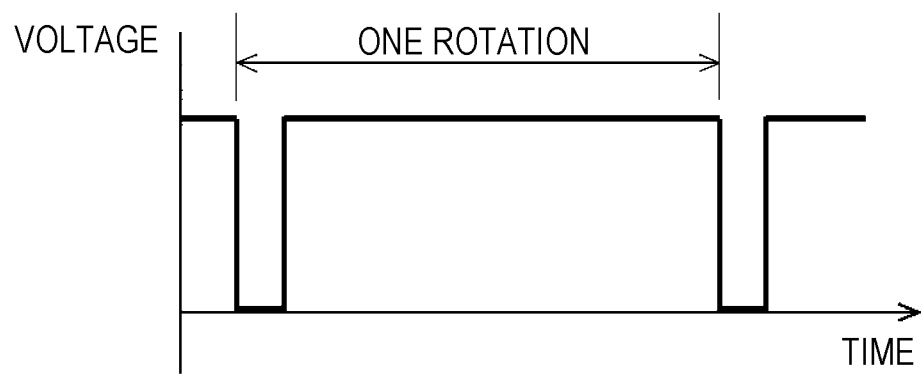
FIG. 7 is a schematic waveform diagram of the detection signals from the Hall element when the cover member is disposed at the uppermost position as illustrated in FIG. 5.

The following describes operations of the sensor 30. In FIGS. 6 and 7, the horizontal axis indicates time while the vertical axis indicates an output voltage of the Hall element 42.

As illustrated in FIG. 4, when the cover member 37 is at the lowest position, the connector 44 and the cover member 37 overlap the rear end cap 14. Furthermore, the peripheral areas of the detected plate 31, the ring-shaped permanent magnet 36, and the Hall element 42 are completely covered and sealed. The Hall element 42 is disposed at the lowest position close to the shaft 19 (the rotating shaft of the magnetic sensor equipped motor 1) with respect to the trajectories of the second rod-shaped portion 34 and the third rod-shaped portion 35. When the detected plate 31 rotates together with the shaft 19, the first rod-shaped portion 33, the second rod-shaped portion 34, and the third rod-shaped portion 35 pass through the front of the Hall element 42 at the lowest position. In this case, the magnetic field acting on the Hall element 42 changes by passing of the three rod-shaped portions. As a result, as illustrated in FIG. 6, the Hall element 42 can output the signals having a waveform that changes into the pulse shape or the reverse pulse shape three times while the shaft 19 rotates by one.

As illustrated in FIG. 5, in the case of the cover member 37 at the uppermost position, the connector 44 projects upward from the upper edge of the rear end cap 14. The Hall element 42 is disposed at the uppermost position (the highest position) between the trajectory of the first rod-shaped portion 33 and the trajectories of the second rod-shaped portion 34 and the third rod-shaped portion 35. When the detected plate 31 rotates together with the shaft 19, only the longest first rod-shaped portion 33 passes through the front of the Hall element 42 at the highest position. The second rod-shaped portion 34 and the third rod-shaped portion 35 pass through a position on the lower side of the Hall element 42 away from the Hall element 42. In this case, the magnetic field acting on the Hall element 42 changes by the passing of the one rod-shaped portion (the first rod-shaped portion 33). Accordingly, as illustrated in FIG. 7, the Hall element 42 can output the signals that have a waveform changing into the pulse shape or the reverse pulse shape one time while the shaft 19 rotates by one.

As described above, in this embodiment, the cover member 37 holding the Hall element 42 can move so as to change the distance from the shaft 19 to the Hall element 42. The detected plate 31 is mounted to the shaft 19 of the motor portion 10. This detected plate 31 includes the plurality of rod-shaped portions radially projecting from the shaft 19, namely, the first rod-shaped portion 33, the second rod-shaped portion 34, and the third rod-shaped portion 35. The lengths of the first rod-shaped portion 33, the second rod-shaped portion 34, and the third rod-shaped portion 35 from the shaft 19 to the distal end differ from one another.

Accordingly, moving the position of the Hall element 42 together with the cover member 37 ensures switching the number of rod-shaped portions passing through the front of the Hall element 42 (detected by the Hall element 42). That is, the cover member 37 moves such that the number of the rod-shaped portions passing through the front of the Hall element 42 can be changed.

For example, assume that the cover member 37 is disposed at the lowest position where the Hall element 42 approaches the shaft 19. In this case, all the plurality of rod-shaped portions 33 to 35 pass through the front of the Hall element 42 and are detected by the Hall element 42. Assume that the cover member 37 is disposed at the uppermost position where the Hall element 42 is away from the shaft 19. In this case, only some of the plurality of rod-shaped portions 33 to 35 (for example, the one rod-shaped portion) pass through the front of the Hall element 42 and are detected by the Hall element 42. Thus, in this embodiment, only switching the position of the cover member 37 can easily change the waveform of the signals output from the Hall element 42.

In this embodiment, the detected plate 31 that includes the rod-shaped portions 33 to 35 is formed by electromagnetic steel plate. The detected plate 31 is stacked over the ring-shaped permanent magnet 36 and is mounted to the shaft 19. The plurality of or the single rod-shaped portion(s) in this detected plate 31 passing through the front of the Hall element 42 ensures changing the waveform of the output signals from the Hall element 42. Accordingly, for example, even if the installation environment of the sensor 30 is contaminated, the Hall element 42 can detect the rod-shaped portion and output the signals with changeable waveform in each detection. It is also possible to change the combination of the number and/or the length(s) of the plurality of rod-shaped portions in the detected plate 31 (the electromagnetic steel plate). This ensures easily changing the waveform of the signals that can be output from the Hall element 42.

In this embodiment, the cover member 37 is movably mounted to the motor portion 10. Therefore, adjusting the position of the cover member 37 ensures easily changing the distance from the shaft 19 to the Hall element 42. Based on the amount of adjustment of the position of the cover member 37, the number of the rod-shaped portions passing through the front of the Hall element 42 and detected by the Hall element 42 can be easily grasped.

The embodiments described above are examples of preferable embodiments of the present disclosure. However, the technique of the present disclosure is not limited to this. The above-described embodiments can be modified or changed in various ways without departing from the gist of the disclosure.

For example, in the embodiment, the ring-shaped permanent magnet 36 is stacked over the detected plate 31. The Hall element 42 electromagnetically detects the rotation of the plurality of or the single rod-shaped portion(s) of the detected plate 31. Besides, for example, instead of disposing the ring-shaped permanent magnet 36, the permanent magnets 36 may be disposed at the distal ends of the plurality of rod-shaped portions 33 to 35 of the detected plate 31. The Hall element 42 may electromagnetically detect the rotation of these permanent magnets 36. The rotation of the plurality of or the single rod-shaped portion(s) of the detected plate 31 may be optically detected by an optical sensor including a light emitting element and a light receiving element.

In the embodiment, the detected plate 31 includes the first rod-shaped portion 33, the second rod-shaped portion 34, and the third rod-shaped portion 35, which are three pieces of linear rod-shaped portions. Besides, for example, the detected plate 31 may include two pieces of the rod-shaped portions or may include four or more rod-shaped portions.

The rod-shaped portions each may not have the linear shape. Devising the combination of the shapes of the plurality of rod-shaped portions of the detected plate 31 ensures easily changing the combination of the change in the pulse-shaped waveform of the signals output from the Hall element 42 while the shaft 19 rotates by one.

In the embodiment, the second rod-shaped portion 34 and the third rod-shaped portion 35 have the identical length. Furthermore, the first rod-shaped portion 33 is formed longer than these members. Besides, for example, the lengths of these three pieces of the rod-shaped portions 33 to 35 may be all different from one another. In this case, for example, the cover member 37 may be disposed at an intermediate position between the lowest position and the uppermost position such that the screws are positioned at the central portions of the slits 41 of the cover member 37. This allows only the long two pieces among the three pieces of rod-shaped portions to pass through the front of the Hall element 42. In this case, the Hall element 42 can output the signals with the waveform that changes into the pulse shape or the reverse pulse shape twice while the shaft 19 rotates by one.

In the embodiment, the cover member 37 includes the pair of slits 41 long in the vertical direction. This ensures the vertical movement of the cover member 37. Besides, for example, the cover member 37 may be laterally movable or may be movable while rotating. In both cases, it is only necessary that changing the position of the cover member 37 changes the distance between the Hall element 42 mounted to the cover member 37 and the shaft 19. In the embodiment, the cover member 37 is movably disposed so as to be close to and separate from the shaft 19 in one direction. This ensures setting a timing of detecting the longest first rod-shaped portion 33 to be an original point timing common among the plurality of positions of the cover member 37 independent of the position of the cover member 37.

The cover member 37 may be mounted to vertically move such that the cover member 37 is away of the shaft 19 in the upper direction. As illustrated in FIG. 4, the cover member 37 is vertically movable in a range from which the cover member 37 is lowered most (hereinafter referred to as the lowest position) such that the screws are in contact with the upper ends of the slits 41 to which, as illustrated in FIG. 5, the cover member 37 is raised most (hereinafter referred to as the uppermost position) such that the screws are in contact with the lower ends of the slits 41 of the cover member 37.

As illustrated in FIG. 4, at the lowest position where the cover member 37 is lowered most, the connector 44 and the cover member 37 may overlap the rear end cap 14, and the peripheral areas of the detected plate 31, the ring-shaped permanent magnet 36, and the Hall element 42 may be completely covered and sealed.

In this embodiment, by the rod-shaped portions made of electromagnetic steel plate mounted to the shaft 19 stacked with the ring-shaped permanent magnet 36 passing through the front of the Hall element 42 ensures changing the waveform of the output signal from the Hall element 42. Accordingly, for example, even if the installation environment of the sensor 30 is contaminated, the Hall element 42 can detect the rod-shaped portion and output the signals where the waveform changes in each detection.

Like this embodiment, disposing the cover member 37 so as to move from/to the shaft 19 in the approaching/separating direction in one direction ensures setting a detection timing of the longest first rod-shaped portion 33 to an original point timing common among the plurality of setting positions independent of the movable position.

The embodiments of the present disclosure may be the following first to fourth sensors for motor.

The first sensor for motor includes a detected plate, a detecting member, and a movable member. The detected plate is mounted to a rotating shaft of a motor to detect a rotation of the motor. The detected plate includes a plurality of rod-shaped portions having different lengths. The plurality of rod-shaped portions radially project from the rotating shaft. The detecting member is disposed for trajectories of a plurality of the rod-shaped portions rotating together with the rotating shaft. The detecting member is configured to output a signal where a waveform changes when the rod-shaped portions pass through. The movable member holds the detecting member.

The second sensor for motor according to the first sensor for motor is configured as follows. The detected plate is formed of an electromagnetic steel plate. To the rotating shaft, a ring-shaped permanent magnet is mounted overlapped with the detected plate. The detecting member is a Hall element configured to magnetically detect a passing of the rod-shaped portions of the detected plate.

The third sensor for motor according to the first or the second sensor for motor is configured as follows. The movable member is a cover member mounted to a housing of the motor to cover the detected plate.

The fourth sensor for motor according to the third sensor for motor is configured as follows. The movable member has an elongated hole-shaped slit. The movable member is screwed to the housing through the slit.

With the first sensor for motor, moving the detecting member together with the movable member ensures switching the number of rod-shaped portions detected by the detecting member among the plurality of rod-shaped portions of the detected plate. This ensures switching the output signals from the detecting member that outputs signals where a waveform changes when the rod-shaped portion passes through. Accordingly, the first sensor for motor can easily change the waveform of the signals detecting the rotation.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A sensor for motor comprising:
   a detected plate mounted to a rotating shaft of a motor, the detected plate including a plurality of rod-shaped portions having different lengths from one another, the plurality of rod-shaped portions radially projecting from the rotating shaft, the plurality of rod-shaped portions rotating with the rotating shaft about an axis of the rotating shaft;
   a detecting member configured to output a signal having a waveform that changes according to the rod-shaped portions passing through a front of the detecting member; and
   a movable member that holds the detecting member,
   wherein when the plurality of rod-shaped portions rotates with the rotating shaft about the axis of the rotating shaft, at least one of the plurality of rod-shaped portions pass through the front of the detecting member.

2. The sensor for motor according to claim 1, wherein the movable member moves such that a count of the rod-shaped portions passing through the front of the detecting member is changeable.

3. The sensor for motor according to claim 1, further comprising
a ring-shaped permanent magnet mounted to the rotating shaft to overlap the detected plate, wherein
the detected plate is formed of an electromagnetic steel plate, and
the detecting member is a Hall element configured to magnetically detect a passing of the rod-shaped portion of the detected plate.

4. The sensor for motor according to claim 2, further comprising
a ring-shaped permanent magnet mounted to the rotating shaft to overlap the detected plate, wherein
the detected plate is formed of an electromagnetic steel plate, and
the detecting member is a Hall element configured to magnetically detect a passing of the rod-shaped portion of the detected plate.

5. The sensor for motor according to claim 1, wherein the movable member is a cover member mounted to a housing of the motor to cover the detected plate.

6. The sensor for motor according to claim 2, wherein the movable member is a cover member mounted to a housing of the motor to cover the detected plate.

7. The sensor for motor according to claim 3, wherein the movable member is a cover member mounted to a housing of the motor to cover the detected plate.

8. The sensor for motor according to claim 4, wherein the movable member is a cover member mounted to a housing of the motor to cover the detected plate.

9. The sensor for motor according to claim 5, wherein the movable member has an elongated hole-shaped slit, the movable member being screwed to the housing through the slit.

10. The sensor for motor according to claim 6, wherein the movable member has an elongated hole-shaped slit, the movable member being screwed to the housing through the slit.

11. The sensor for motor according to claim 7, wherein the movable member has an elongated hole-shaped slit, the movable member being screwed to the housing through the slit.

12. The sensor for motor according to claim 8, wherein the movable member has an elongated hole-shaped slit, the movable member being screwed to the housing through the slit.

13. The sensor for motor according to claim 1, wherein the detecting member is disposed in a direction of the rotating shaft.

14. The sensor for motor according to claim 1, wherein the movable member vertically moves such that the movable member is away of the rotating shaft.

15. The sensor for motor according to claim 1, wherein the movable member moves in a direction perpendicular to an axis of the rotating shaft.

16. The sensor for motor according to claim 1, wherein the detecting member magnetically detects the passing of at least one of the plurality of the rod-shaped portions.

17. The sensor for motor according to claim 1, wherein the detecting member is a Hall element that magnetically detects the passing of at least one of the plurality of the rod-shaped portions.

18. The sensor for motor according to claim 1, wherein the detecting member magnetically detects a change in a magnetic field.

19. The sensor for motor according to claim 18, wherein the waveform changes according to the change in the magnetic field.

20. A sensor for motor comprising:
a detected plate mounted to a rotating shaft of a motor, the detected plate including a plurality of rod-shaped portions having different lengths from one another, the plurality of rod-shaped portions radially projecting from the rotating shaft, the plurality of rod-shaped portions rotating with the rotating shaft about an axis of the rotating shaft;
a detecting member configured to output a signal having a waveform of a magnetic field that changes according to the rod-shaped portions passing through a front of the detecting member; and
a movable member that holds the detecting member,
wherein when the plurality of rod-shaped portions rotates with the rotating shaft about the axis of the rotating shaft, at least one of the plurality of rod-shaped portions pass through the front of the detecting member.

* * * * *